United States Patent [19]

Tippmer

[11] Patent Number: 4,993,873
[45] Date of Patent: Feb. 19, 1991

[54] PROCESS FOR TREATING CONTAMINATED EARTH

[75] Inventor: Kurt Tippmer, Recklinghausen, Fed. Rep. of Germany

[73] Assignee: Still Otto GmbH, Fed. Rep. of Germany

[21] Appl. No.: 346,993

[22] PCT Filed: Oct. 2, 1987

[86] PCT No.: PCT/EP87/00568
§ 371 Date: May 3, 1989
§ 102(e) Date: May 3, 1989

[87] PCT Pub. No.: WO88/02285
PCT Pub. Date: Apr. 7, 1988

[30] Foreign Application Priority Data

Oct. 3, 1986 [DE] Fed. Rep. of Germany ....... 3633699

[51] Int. Cl.$^5$ .............................................. B09B 3/00
[52] U.S. Cl. ..................................... 405/128; 110/346; 405/129
[58] Field of Search ........................ 405/128, 129, 258; 110/233, 226, 229, 236, 346; 134/25.1, 26; 203/40, 41; 432/72, 105; 210/178, 170, 800

[56] References Cited

U.S. PATENT DOCUMENTS

| | | | |
|---|---|---|---|
| 4,098,648 | 7/1978 | Kraemer et al. | 196/14.52 |
| 4,715,965 | 12/1987 | Sigerson et al. | 210/800 |
| 4,751,887 | 6/1988 | Terry et al. | 110/346 |
| 4,815,398 | 3/1989 | Keating et al. | 110/346 X |
| 4,927,293 | 5/1990 | Campbell | 405/128 |
| 4,934,285 | 6/1990 | Jormanainen et al. | 110/346 |

OTHER PUBLICATIONS

Umwelt, 2, 1986, S. 121-124.

Primary Examiner—Dennis L. Taylor
Attorney, Agent, or Firm—McGlew and Tuttle

[57] ABSTRACT

The invention comprises a process for treating contaminated earth with different organic and inorganic substances, such as for example benzene, toluene, naphthalene, phenols and other mono- and polycyclic or aliphatic oxygen-, nitrogen- and sulphur-containing hydrocarbon compounds as well as simple and complex inorganic or organic salts. The invention concerns a combination of the following processing stages: (a) homogenization and comminution of the contaminated earth with an addition of treated recycled water to obtain a pumpable suspension; (b) treatment of the suspension in a single- or multi-stage extraction process in counter-current with warm or hot recycled water according to the principle of increased dissolving power at high temperatures (over 100° C.) and at the corresponding pressure above the vaporization point; (c) drying of the suspension taken from the extraction systems until a residual humidity of less than 30% by weight approximately is obtained; and separating the dissolved substances contained in the recycled water (extraction agent) by cooling according to the principle of reduced dissolving power.

13 Claims, 2 Drawing Sheets

PROCESS FOR TREATING CONTAMINATED EARTH

FIELD AND BACKGROUND OF THE INVENTION

The invention relates in general to contaminated earth treatment and in particular to a new and useful process for the treating of contaminated earth by homogenizing and comminuting the material and adding water and thereafter treating the water suspension by drying it and separating dissolved substances.

According to the invention contaminated earth, in particular earth from coking plants or plants with similar products is treated. This earth is usually contaminated with various anorganic and organic substances, such as benzene, toluene, naphthalene, phenols and other mon- and polycyclic or aliphatic oxygen-, nitrogen- and sulphur-containing hydrocarbon compounds as well as simple and complex inorganic or organic salts.

From German OS No. 32 16 771 a process for the cleaning of earth contaminated with toxic material is known, wherein the earth is e.g. heated in a rotating drum and the resulting gas products are burnt.

German patent application No. P34 47 079 also refers to a process for the thermal treatment of contaminated earth. Herein the earth is treated at a temperature of at least 600° C. and the resulting gas is also burnt. In the two cited processes, the gas contaminants are removed from the earth by means of thermal treatment at relatively high temperatures. For this purpose a relatively large amount of energy is required.

German Os No. 25 31 732 describes a process for the removal, treatment and regeneration of oil-polluted earth. Herein the oil and the water-soluble noxious components are washed out in low surface tension water preferably at temperatures between 60° and 90° C. Herein the comminuted material to be treated is intensively mixed with the cleaning medium in a spiral drum and then separated from the pollutant-binding cleaning medium by sedimentation in a clearing sump.

A similar process for the regeneration of earth, contaminated in particular by oil is known from German OS No. 27 24 271. Herein the contaminated earth is suspended [slurry] possibly after comminution, in a liquid, e.g. water and then heated to vaporizing temperature in a continuous flow chamber. The upper layer of the suspension is stripped off and separated in the continuous flow chamber. It has been proven that the substances dissolved are not washed out from the contaminated earth in such a process at the vaporization temperature of water.

SUMMARY OF THE INVENTION

The invention provides a process for the treatment of contaminated earth, wherein the complex thermal treatment at a temperature of at least 600° C. can be omitted and a homogenization and comminuting of the treated substances is carried out and the resultant material is formed into a suspension with water in a subsequent extraction process.

The process according to the invention has the following advantages with regard to the described known processes:

1. Compared to thermal processes (combustion or pyrolysis) at temperatures of 600° C. and above, less energy from outside is required.
2. During the treatment of the liquid and gas contaminant less noxious matter is generated during the partial oxidation (POX) above 1200° C., while during pyrolysis and combustion hazardous substances, such as dioxines and furanes, can be generated.
3. The revitalization of the treated earth is simpler compared to the sintering and klinkering of the earth in the thermal processes.
4. The remaining C-contents of the earth treated in the extraction stages is considerably smaller than in the case of pyrolysis of the earth at temperatures of more than 600° C.
5. Simple solvents, such as water, can be employed.
6. There is the option of using a membrane process for the treatment of these waters and the generation of pure water for the final treatment of the contaminated earth.
12. The combustion of the pollutant-rich residual gas of the POX, in addition to the POX, serves for energy recovery and the $CO_2$ forming can be used in the carbonization stage.

Accordingly, it is an object of the invention to provide a process for contaminated earth which comprises homogenizing and comminuting the contaminated earth to form a dissolved portion, adding recycled water to the discharge portion to form a suspension which is contaminated with anorganic and organic substances, treating the suspension in an extraction system with at least either warm or hot water to form an extraction, and drying the extraction and separating the dissolved substances from the cycle water.

A further object of the invention is to provide a process in which the suspension is further treated and countercurrent with the cycle water at least in one stage and at a temperature in the range of from around 120° to 180° C. and a pressure 8 to 12 bars and drying the extraction to an approximate residual humidity of from 30% by weight and separating the soluble substances from the cycle water by means of a condensation.

A further object of the invention is to provide a process for treating contaminated earth which is to carry out and is relatively inexpensive and may be carried out in a simple apparatus.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DETAILED DESCRIPTION OF THE PREFERRED EMBODIMENTS

Figure 1:
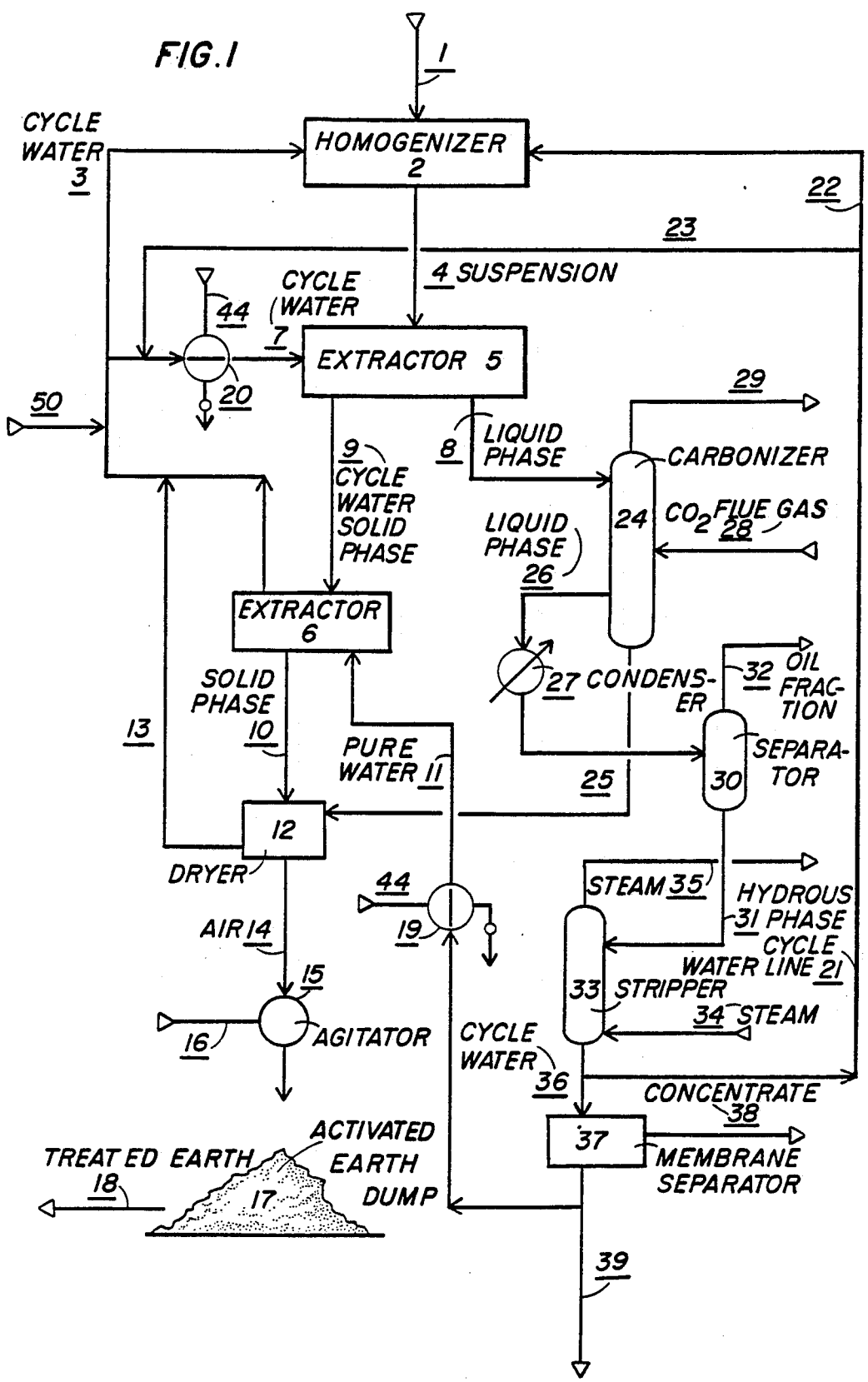
FIG. 1 is a schematic diagram of a process flow system constructed in accordance with the invention.
Figure 2:
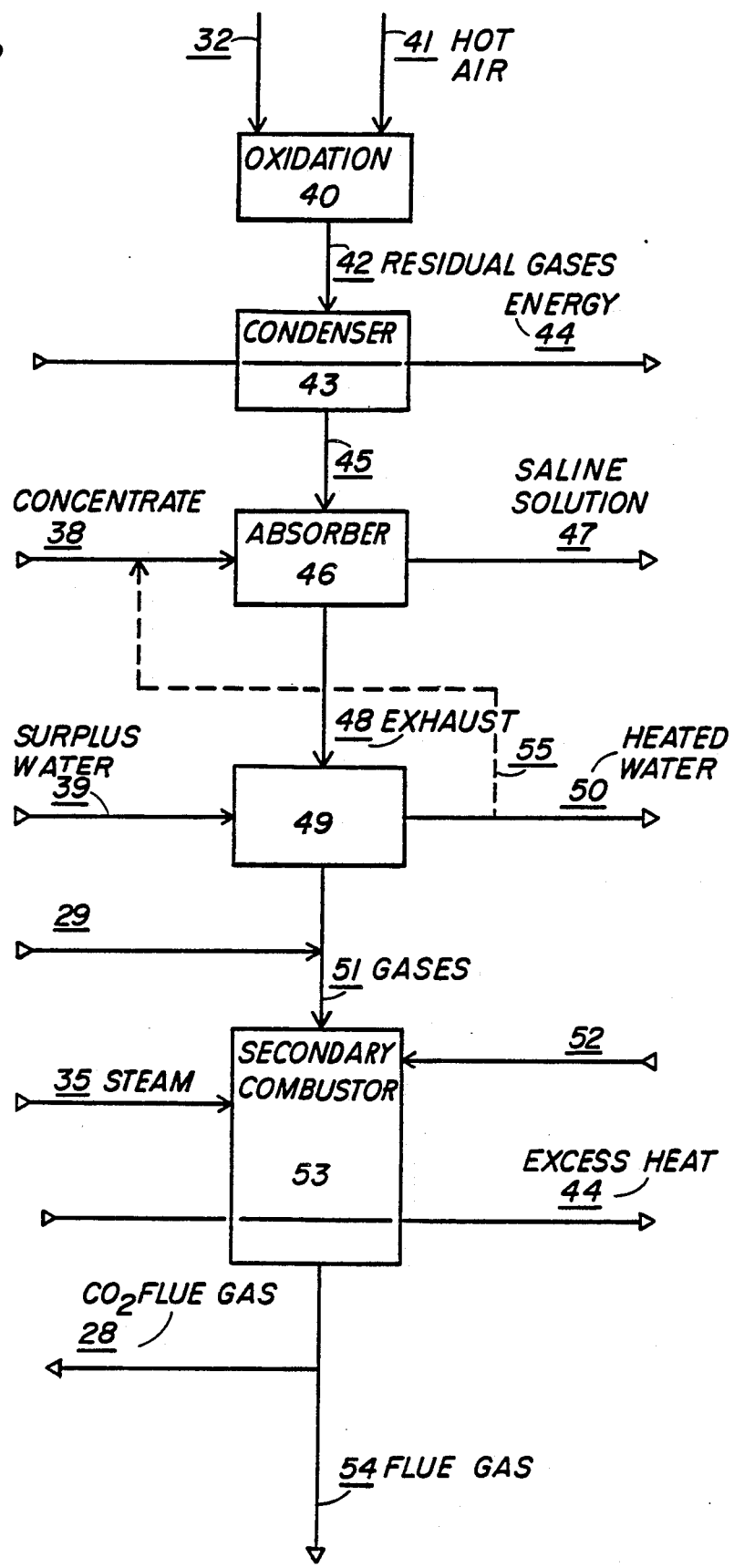
FIG. 2 is a view similar to FIG. 1 showing additional process steps possible with the invention.

The contaminated earth 1 is comminuted in a homogenizer 2 and then treated cycle water 3/22 is added to obtain a suspension 4 (up to 300 g/l).

In an extraction system or extractors 5 and 6 (multistage) the homogenized earth suspensions 4 and 9 are treated with cycle water 7 and 11 in a counter-current. The operational parameters are in particular:

| Temperature | t    140 to 180° C. |
|---|---|
| Pressure | p = 8 to 12 bar |
| Acidity | pH = 8 to 9 |

A liquid phase 8 and solid phases 9 and 10 form in the respective extractors 5 and 6, so that so-called separation effects occur. The use of mechanical elements (agitators) or appropriate counter-current cascades ensures that the solid phase remains a free-flowing suspension.

In the secondary extraction 6 the suspension 9 is aftertreated with so-called pure water 11.

In a drier system or dryer 12 (drum or belt dryer) the earth is separated from the residual water until a residual humidity of less than 30% by weight is obtained.

In a further homogenizer and agitator 15, a biomass (humus or such like) is admixed with the earth 14 and then the mixture is stored in a so-called maturity or activated earth dump 17. After a certain period of time the earth 14 is available again as treated earth 18.

The physical process of hot-water extraction is expected to yield a removal of harmful substances of 95% or more. The remainder (mainly hydrocarbons without tied on [bound] S-, O- or N-atoms) of 5% or less has to be dealt with by the microorganisms of the activated earth dump. Anorganic electrolytes, which e.g. form during hydrolysis from the respective hydrocarbons, can also be removed from the cycle by means of reverse osmosis.

As the residual contamination of the earth consists mainly of hydrocarbons, these residues can be degraded by known, selectively working means.

The charged hot water or liquid phases 8 and 26 of the extraction 5 is then condensed and thus the dissolving power is reduced. The condensator 27 may comprise a one-stage or a multi-stage process, so that different oil-fractions 32 can be drawn off from the following separators 30 if necessary.

For the setting of the alkali-aluminate-silicate contents of the hot-water 8 an additional carbonization stage or carbonizer 24 can be inserted, where e.g. by means of $CO_2$-containing flue gas 28 a part of these substances at liquid phase 25, e.g. $Al_2O_3$, $SiO_2$, which usually have the form of colloid solutions, is precipitated. These substances are admixed with the earth, e.g. in the drier 12.

The oily phase with its sulphur-, oxygen- nitrogen- and halogen-containing harmful substances 32 is then transformed into the residual gases 42, 45, 48, 51 CO and $H_2$, $H_2S$, HCl, HF etc. by means of $O_2$, hot air 41 or a mixture of $O_2$ and air in the partial oxidation process (POX) 40 at temperatures of 1200° to 1400° C. Resulting by-products, such as HCL, $H_2S$, COS and traces of $NH_3$ and HCN could be removed from the cracked gas by means of known processes.

Then the gas is burnt. The energy 44 recovered in the condenser 43 from the waste heat of the residual gases 42 of the POX 40 and during the secondary combustion (53) serves for the additional heating 19 and 20 of the water which flows in lines 11 and 7 of the extractors 5 and 6 and/or directly as an actuation of mechanical devices.

If necessary, steam with $H_2S$, $NH_3$ and HCN at line 35 are separated from the hydrous phase 31 in a stripper 33 with the addition of direct steam 34. A part of the cycle water from the stripper 33 is supplied to the homogenization process through the line 21 and 22 or to the extraction stage 5 through the line 23 as cycle water. The other part of the cycle water 36 is recycled as so-called pure water, this is effected by means of the membrane separation process cross-flow filtration and/or reverse osmosis in a separator 37. The concentrate 38 is admixed with the cycle water once the saline solution 47 has been separated in a halogen absorber 46. Or, the concentrate 38 can also be admixed with the oily phase of the POX 40 as a moderator. The pure water obtained after the reverse osmosis 37 is preferably led to the final extraction stage 6 over the line 11. The surplus water 39 is either transferred out of the system or it is heated up direct coder by means of the exhaust gas 48 of the halogen absorber 46 and then used as heated water 50 for the extraction stages 5 and 6 and then either admixed with the untreated cycle water 3 or added to the concentrate 38 before the halogen absorber 46.

In the secondary combustion 53 the residual gases 51 are afterburned once air 52 and vapors 35 from the stripper 33 are added. Excess heat 44 is extracted from the flue gases 54 before they are released into the atmosphere, the excess heat serving for the heating of water 19 and 20.

While specific embodiments of the invention have been shown and described in detail to illustrate the application of the principles of the invention, it will be understood that the invention may be embodied otherwise without departing from such principles.

I claim:

1. A process for treating contaminated earth, comprising homogenizing and comminuting the contaminated earth to form a dissolved portion, adding cycle water to the dissolved portion to form a suspension which is contaminated with anorganic and organic substances by treating it in countercurrent with said cycle water in at least one stage system at a temperature in the range of approximately from 120° to 180° C. and a pressure of from 8 to 12 bars using at least one of warm and hot water in order to form an extraction, drying the extraction, separating of dissolved substances form the cycle water, said suspension drawn from said extractor being dried to an approximate residual humidity of 30% by weight, and separating soluble substances from the cycle water by means of condensation.

2. A process according to claim 1, wherein the extraction is carried out at a temperature in the range of from 140° to 180° C.

3. A process according to claim 1, wherein a free flowing suspension is maintained in said extraction by means of mechanical elements.

4. A process according to claim 1, wherein the extraction is carried out to a last extraction stage and the suspension is after treated with pure water generated by means of reverse osmosis.

5. A process according to claim 1, wherein the dried earth is homogenized and a bio-mass preferably humus earth is admixed with it and the resulting mixture is then stored in a maturing or activated earth dump.

6. A process according to claim 1, wherein the residual harmful substances remaining in the earth are removed by microorganisms.

7. A process according to claim 1, wherein the heated water obtained after extraction is condensed in one of several stages for separation of different oil fractions.

8. A process according to claim 1, wherein for the purpose of setting an alkali-aluminate-silicate content of the heated water drawn from said extractor, a part of each of these substances which are usually in the form of colloid solution is precipitated by means of a $CO_2$ containing flue gas.

9. A process according to claim 1, wherein an oily phase separated from the hot water with its sulphur-, oxygen-, nitrogen- and halogen-containing harmful substances is transformed into CO, $H_2$, $H_2S$, HCl, and HF in a process of partial oxidation by means of $O_2$ hot air and a mixture of $O_2$ and air at a temperature of from 1200° to 1400° C.

10. A process according to claim 9, wherein the resulting gas is burnt after having been purified from $H_2S$ and halogen by washing.

11. A process according to claim 9, wherein the energy from the waste heat is used for the heating of the extraction stages.

12. A process according to claim 9, wherein the cycle water is treated by means of cross flow filtration and reverse osmois to yield pure water which is used for the final extraction and whose excess is transferred out of the system.

13. A process according to claim 9, wherein a concentrate of a reverse osmosis is mixed with an oily phase separated from the hot water so that they can be transformed together.

* * * * *